United States Patent
Steiner et al.

(10) Patent No.: US 10,561,974 B2
(45) Date of Patent: Feb. 18, 2020

(54) BULK DELIQUIDIZER/DESANDER COALESCER

(71) Applicant: TM Industrial Supply, Inc., Erie, PA (US)

(72) Inventors: Carl A. Steiner, Erie, PA (US); Ricky L. Jackson, Union City, PA (US); Yousif A. Khalid Al-Abdullah, Erie, PA (US)

(73) Assignee: TM Industrial Supply, Inc., Erie, PA (US)

( * ) Notice: Subject to any disclaimer, the term of this patent is extended or adjusted under 35 U.S.C. 154(b) by 130 days.

(21) Appl. No.: 15/186,985

(22) Filed: Jun. 20, 2016

(65) Prior Publication Data

US 2016/0375389 A1 Dec. 29, 2016

Related U.S. Application Data

(60) Provisional application No. 62/183,355, filed on Jun. 23, 2015.

(51) Int. Cl.
*B01D 46/00* (2006.01)
*B01D 46/52* (2006.01)
*B01D 45/08* (2006.01)
*B01D 50/00* (2006.01)

(52) U.S. Cl.
CPC .......... *B01D 46/003* (2013.01); *B01D 45/08* (2013.01); *B01D 46/521* (2013.01); *B01D 50/002* (2013.01)

(58) Field of Classification Search
CPC ..... B01D 19/00–19/0495; B01D 46/00; B01D 46/521; B01D 45/08; B01D 50/002; B01D 45/04–45/10; B01D 46/003–46/0031; B01D 50/00–50/008;
(Continued)

(56) References Cited

U.S. PATENT DOCUMENTS 2,756,837 A * 7/1956 Lovelady ........... B01D 19/0057
60/39.826
3,386,230 A * 6/1968 Riesberg ............ B01D 19/0031
55/337
(Continued)

FOREIGN PATENT DOCUMENTS

CA 2426752 A1 10/2003
EP 3244152 A1 * 11/2017

*Primary Examiner* — T. Bennett McKenzie
(74) *Attorney, Agent, or Firm* — The Webb Law Firm (57) ABSTRACT

A desander for use with a separator for removing sand and other particles from gas under pressure including a diverter manifold including an inlet opening and an outlet opening. The inlet opening is configured for receiving the gas. The outlet opening is in fluid communication with a housing. The housing includes processing equipment for separating sand, particles, and/or liquid from the gas. The diverter manifold includes a flow diverter. The flow diverter is configured to redirect the path of the gas and its contaminants. The diverter manifold is also designed to slow down a velocity of the gas entering into the inlet opening prior to entrance of the gas into the housing of the separator to reduce erosion of the processing equipment and to facilitate separation of the sand and particles from the gas. A method of removing sand, other particles, and liquid from gas under pressure is also provided.

15 Claims, 6 Drawing Sheets

(58) Field of Classification Search
CPC ........ E21B 21/06–21/07; E21B 21/061; E21B 21/063–21/067; E21B 43/34–43/40
USPC .... 95/266, 267, 268, 272; 210/512.1–512.3; 55/392–399, 435, 436, 465
See application file for complete search history.

(56) References Cited

U.S. PATENT DOCUMENTS

| | | | | |
|---|---|---|---|---|
| 3,997,303 | A * | 12/1976 | Newton | B01D 46/00 55/320 |
| 4,539,023 | A * | 9/1985 | Boley | B01D 1/305 96/184 |
| 6,251,152 | B1 * | 6/2001 | Thiele | B01D 45/08 406/168 |
| 6,419,730 | B1 * | 7/2002 | Chavez | B01D 45/08 55/430 |
| 6,537,458 | B1 * | 3/2003 | Polderman | B01D 17/00 210/188 |
| 7,332,010 | B2 | 2/2008 | Steiner | |
| 7,503,950 | B2 | 3/2009 | Håland | |
| 7,850,751 | B2 | 12/2010 | Steiner | |
| 9,005,328 | B2 | 4/2015 | Steiner et al. | |
| 9,192,884 | B2 | 11/2015 | Steiner et al. | |
| 2011/0247500 | A1 * | 10/2011 | Akhras | B01D 17/0217 96/182 |

* cited by examiner

BULK DELIQUIDIZER/DESANDER COALESCER

CROSS-REFERENCE TO RELATED APPLICATIONS

This application claims priority from U.S. Provisional Application No. 62/183,355, filed Jun. 23, 2015, which is incorporated herein by reference.

BACKGROUND OF THE INVENTION

Field of the Invention

The present invention is directed to a bulk deliquidizer/desander coalescer vessel, and more particularly, to a bulk deliquidizer/desander coalescer vessel including a flow diverter that diverts liquid/sand/gas as it enters the vessel, slowing down the flow, reducing erosion of the processing equipment, and causing the sand to dissipate and drop out of the flow prior to gas/liquid separation.

Description of Related Art

There are a number of existing configurations and designs of deliquidizers, desanders, and coalescing filters on the market. One example is disclosed in U.S. Pat. No. 7,503,950 to Håland, which disclosed a scrubber, a column, a separator or other separation equipment, combined with a deliquidizer that is connected as a pre-separator to the fluid outlet wherein the deliquidizer functions according to a cyclone principle.

During hydraulic fracturing ("fracking"), such as in the Marcellus Shale industry, wet gas exiting the wellhead is often fed into a 2-phase or 3-phase deliquidizer coalescer separator to separate the liquid condensates from the gas. Coalescing is the process where liquid aerosols in a compressed gas/air system are forced to join together into larger droplets. These combined droplets then can be drained away by gravity. This wet gas from the wellhead can also include sand and other particles. The bulk deliquidizer/desander is comprised of a horizontal chamber containing baffle plates that are designed to entrap sand and other particles allowing them to eventually settle in a compartment in the bottom of the horizontal chamber. The wet gas can then enter into a vertical tower or a horizontal portion of the chamber that houses the vane separator. The vane separator can remove all liquids down to approximately 10 microns. The almost-dry gas then moves into the gas coalescing chamber where it is directed through a coalescing filter element. One example of a high pressure filter/separator gas chamber is disclosed in U.S. Pat. No. 7,332,010, owned by TM Industrial Supply, Inc., the Applicant of the present invention, the entirety of which is hereby incorporated in the present application. The high-pressure filter/separator utilizes Gas Flow Membrane Technology (GFM Technology®) that employs a reverse flow design through a multi-stage filtration vessel utilizing an out-to-in flow through a pleated coalescing filter.

The sand and particles within the wet gas exit the wellhead and enter into the inlet of the separator at very high pressures and/or velocities. This sand, fed at these high pressures and velocities, can eventually erode the valving, piping and other processing equipment used in the separator-type systems. Thus, a need exists to provide a separator that includes a flow diverter that diverts liquid/sand/gas from the fracked gas as it enters the horizontal chamber of the coalescer, slowing down the flow and causing the sand to dissipate and drop out of the flow prior to entering into the gas/liquid separation phase of the separator.

SUMMARY OF THE INVENTION

The bulk deliquidizer/desander coalescer is designed to remove sand and liquid and filter a gas all in one pressure vessel. The vessel configuration allows the inlet and outlet connections to be in line with each other (same centerline to floor elevation), thus making the connecting process piping easier to configure and manufacture. The high pressure gas, along with any liquids, sand, mill scale, etc., enters into the inlet where it is diverted into the lower portion of the vessel which has a larger volume enabling the velocity of the entrants to slow down. This flow diverter is designed to be a wear point and can be replaced when required. The slower velocity allows the sand and heavier particulates to drop out of the gas flow. Baffle plates are positioned within the lower portion of the vessel to aid in the removal of larger droplets of liquid by allowing them to collect or pool at the bottom of the vessel while keeping them from being unobstructed and continuing along with the gas flow. The gas flow then turns upward and into a vane mist eliminator. The gas travels through the vane mist eliminator where smaller droplets of liquid down to 10 microns are removed and funneled back down to the lower portion of the vessel body. The gas then travels to the final stage of coalescing and filtration. This final stage is comprised of a coalescing filter element that is designed to remove particulates and aerosols down to 0.3 microns. The coalesced liquid from the final stage is funneled down to the lower portion on the vessel via the vane mist eliminator.

In accordance with an embodiment of the present disclosure, a desander for use with a separator for removing sand and other particles from gas under pressure includes a diverter manifold including an inlet opening and an outlet opening wherein the inlet opening is configured for receiving the gas. A housing is provided in fluid communication with the outlet opening of the diverter manifold. The housing includes processing equipment for separating sand, particles, and/or liquid from the gas. A flow diverter is positioned within the diverter manifold. The flow diverter is configured to redirect a flow of the gas and/or slow down a velocity of the gas entering into the inlet opening of the diverter manifold prior to entrance of the gas into the housing to reduce erosion of the processing equipment and to facilitate separation of the sand and particles from the gas.

According to one embodiment, the inlet opening of the diverter manifold is configured to receive gas exiting from a wellhead. The inlet opening of the diverter manifold and an outlet opening of the separator can be positioned at least partially in line with each other and on a same elevation.

In a further embodiment, the flow diverter comprises an impingement plate having a deflector. This impingement plate can be angled in a downward direction with respect to the inlet opening of the diverter manifold to cause the gas to divert from a horizontal flow from the inlet opening to a vertically downward flow through the outlet opening of the diverter manifold. According to one embodiment, the impingement plate can be angled at an approximate 45-90° angle with respect to a horizontal centerline extending through the diverter manifold.

In a further embodiment, to further slow the velocity of the gas within the diverter manifold prior to entering into the separator, an inlet portion of the diverter manifold can be designed to have a first diameter, and a portion of the diverter manifold located downstream from the inlet portion can be designed to have a second diameter that is greater than the first diameter so as to increase the volume within the diverter manifold in which the gas is flowing after entrance therein and consequently decrease the velocity of the gas.

In accordance with another embodiment of the present disclosure, a deliquidizer/desander coalescer is provided that comprises a diverter manifold including an inlet opening and an outlet opening, wherein the inlet opening is configured for receiving gas under pressure. A flow diverter is positioned within the diverter manifold. The flow diverter is configured to redirect a flow direction of the gas and to decrease a velocity of the gas entering into the inlet opening of the diverter manifold. A housing is provided in fluid communication with the outlet opening of the diverter manifold. The housing includes a plurality of baffles located therein. The coalescer also includes at least one filter arrangement located downstream from the inlet opening and the plurality of baffles for separating liquid from the gas.

In a further embodiment, the flow diverter can include a deflector that is angled in a downward direction with respect to the inlet opening of the diverter manifold to cause the gas to divert from a horizontal flow from the inlet opening to a vertically downward flow to exit through the outlet opening of the diverter manifold. According to one embodiment, the deflector can be angled at an approximate 45-90° angle with respect to a horizontal centerline extending through the diverter manifold.

In a further embodiment, to further slow the velocity of the gas within the diverter manifold prior to entering into the coalescer, an inlet portion of the diverter manifold can be configured to have a first diameter, and a portion of the diverter manifold located downstream from the inlet portion can be configured to have a second diameter that is greater than the first diameter so as to increase the volume within the diverter manifold and decrease the velocity of gas.

According to one embodiment, the at least one filter arrangement can include at least one vane separator for separating liquid from the gas. Also, the at least one filter arrangement can include a pleated filter element, and the coalescer can be configured to cause the gas to flow from an exterior of the filter element to a hollow interior of the filter element.

In a further embodiment, the at least one filter arrangement also includes an outlet opening, and according to one embodiment, the inlet opening of the diverter manifold and the outlet opening of the filter arrangement can be positioned at least partially in line with each other and on a same elevation.

In accordance with yet another embodiment of the present disclosure, a method of removing sand, other particles, and liquid from gas under pressure is provided. The method includes: providing a diverter manifold including an inlet opening and an outlet opening, wherein the inlet opening is configured for receiving the gas; providing a housing in fluid communication with the outlet opening of the diverter manifold, wherein the housing includes processing equipment for separating the sand and other particles from the gas; and positioning a flow diverter within the diverter manifold. The flow diverter is configured to redirect a flow direction of the gas and to decrease a velocity of the gas entering into the inlet opening of the diverter manifold, to reduce erosion of processing equipment and to facilitate separation of the sand and particles from the gas.

According to one embodiment, the inlet opening of the diverter manifold and an outlet opening in the housing can be positioned at least partially in line with each other and on the same elevation.

In a further embodiment, the flow diverter can include a deflector having an angle configured to cause a horizontal flow of the gas entering the inlet opening of the diverter manifold to be diverted into a vertical flow prior to exiting the outlet opening of the diverter manifold and entering into the housing.

According to one embodiment, the method can include providing a plurality of baffles within the housing and associating the housing with one of a 2-phase and a 3-phase gas coalescing filter.

In a further embodiment, in order to further slow down the gas moving through the diverter manifold and subsequently into housing of the separator, the diverter manifold can be designed so as to have a first diameter at an inlet portion and a second diameter at a portion located downstream from the inlet portion, wherein the second diameter is greater than the first diameter. This increase in volume within the diverter manifold slows down a velocity of the gas entering into the inlet opening of the diverter manifold prior to entrance of the gas into the housing.

These and other features and characteristics of the invention as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only, and are not intended as a definition of the limits of the invention. As used in the specification and the claims, the singular form of "a", "an", and "the" include plural referents unless the context clearly dictates otherwise.

DESCRIPTION OF THE INVENTION

For purposes of the description hereinafter, spatial orientation terms, as used, shall relate to the referenced embodiment as it is oriented in the accompanying drawing figures or otherwise described in the following detailed description. However, it is to be understood that the embodiments described hereinafter may assume many alternative variations and configurations. It is also to be understood that the specific components, devices, and features illustrated in the accompanying drawing figures and described herein are simply exemplary and should not be considered as limiting.

Figure 1:
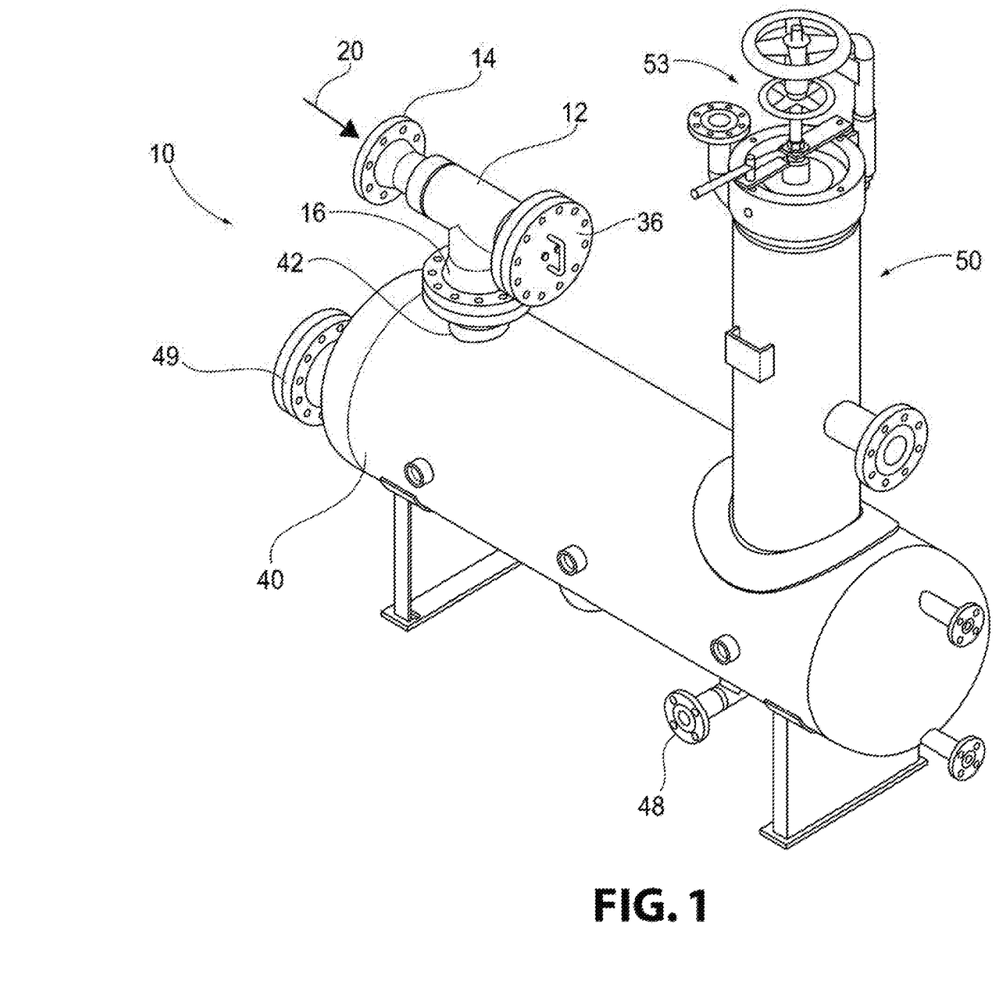
FIG. 1 is a perspective view of the bulk deliquidizer/desander coalescer in accordance with an embodiment of the invention.
Figure 2:
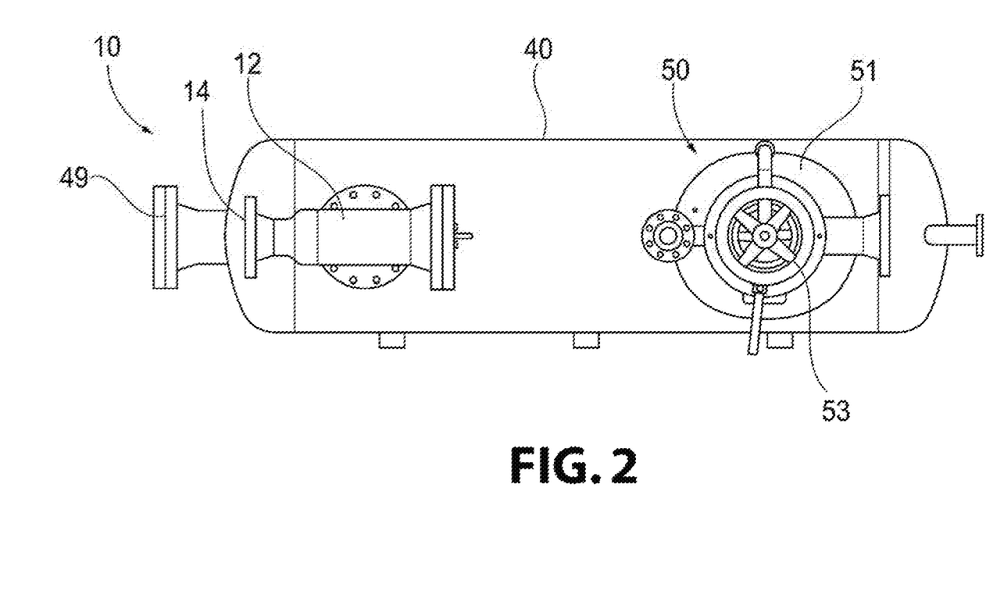
FIG. 2 is a top view of the bulk deliquidizer/desander coalescer of FIG. 1 in accordance with an embodiment of the invention.
Figure 3:
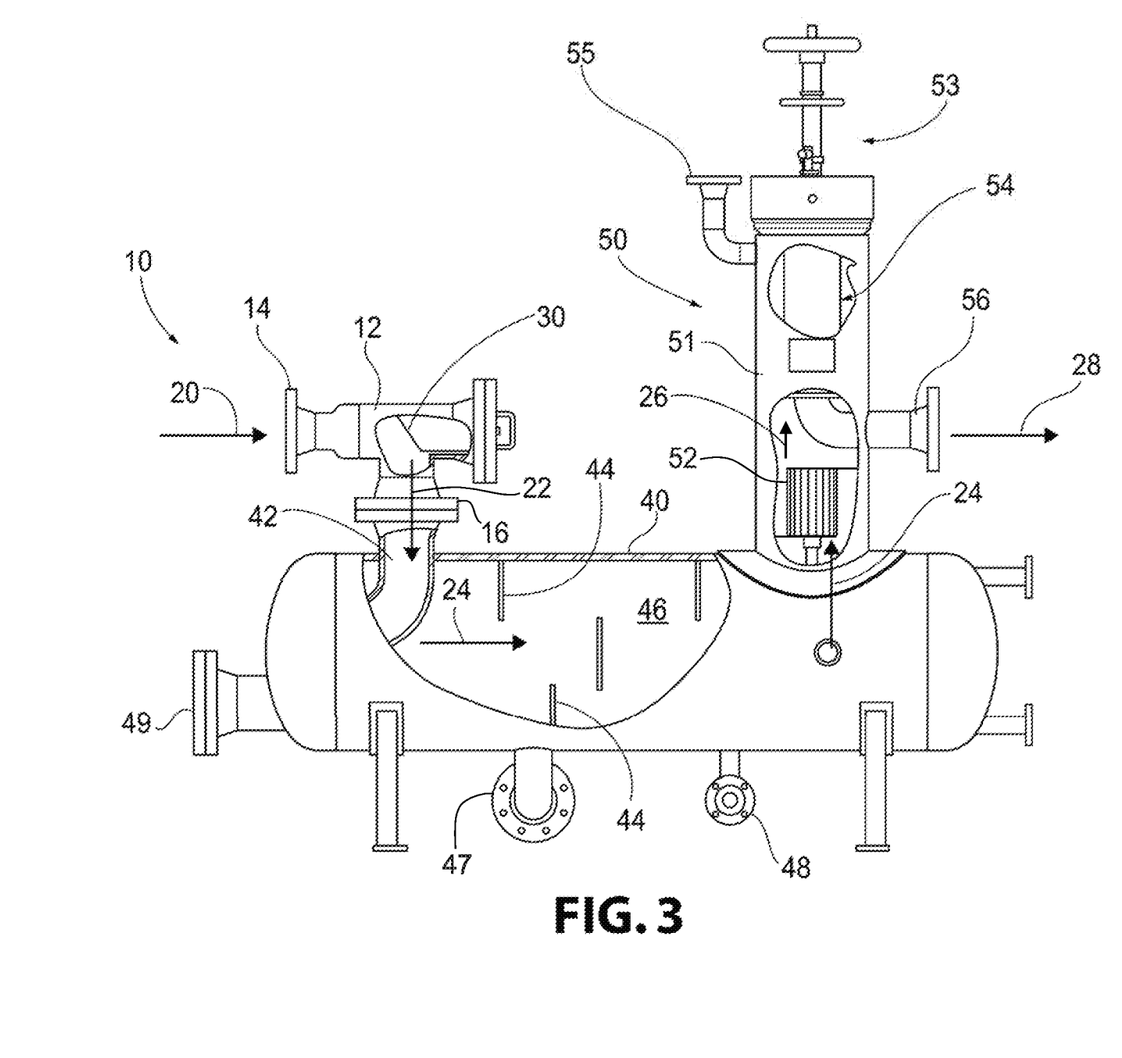
FIG. 3 is a side elevation view including cut-out portions of the bulk deliquidizer/desander coalescer of FIG. 1 in accordance with an embodiment of the invention.
Figure 4:
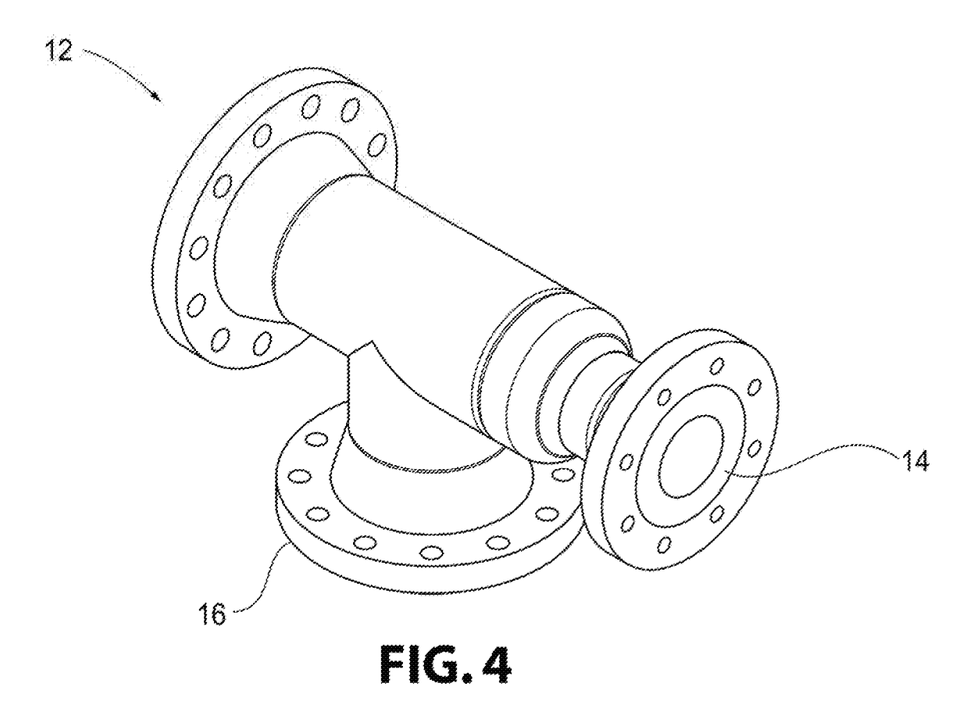
FIG. 4 is a perspective view of the diverter manifold for use with the bulk deliquidizer/desander coalescer of FIG. 1 in accordance with an embodiment of the invention.

Reference is now made to FIGS. 1-3 which show the bulk deliquidizer/desander coalescer, generally indicated as 10, in accordance with the invention. The deliquidizer/desander coalescer includes a diverter manifold 12 including an inlet opening 14 and an outlet opening 16. The inlet opening 14 is configured for receiving a gas under pressure, shown by arrow 20. The gas is usually a wet gas and includes sand and other particles therein. According to one embodiment, the coalescer 10 can be provided on location, such as at a Marcellus Shale site, at or near a gas wellhead, so that the gas exiting the wellhead can be immediately supplied into the diverter manifold 12 of the coalescer 10 for separation of the sand and particles from the wet gas. It can be appreciated that the desander of the present invention can also be used at any gas drilling site location or further down in the pipeline between compressor stations. Some other shale plays where this device can be utilized include Eagle Ford, Bakken, Barnett, Fayetteville, Haynesville, and the like.

Figure 5:
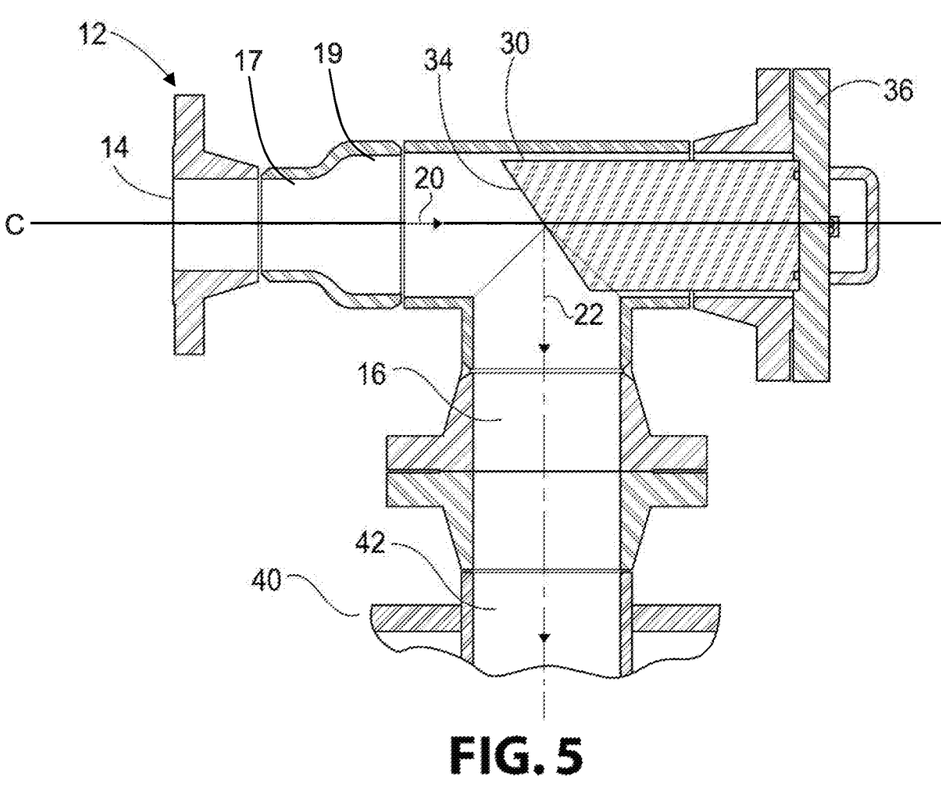
FIG. 5 is a cross-sectional view of the diverter manifold of FIG. 4 in accordance with an embodiment of the invention.

A flow diverter 30, as shown in detail in FIG. 5, is positioned within the diverter manifold 12. The flow diverter 30 is configured to redirect a flow direction of the gas moving in a first direction, which can be an essentially horizontal flow, as shown by arrow 20, to a second direction, which can be an essentially vertical flow, as shown by arrow 22. Also, after the gas enters into the inlet 14 of the diverter manifold 12, it can be slowed down by an expansion of the area through which it is traveling within the diverter manifold 12. For example, an inlet portion of the diverter manifold 12 can be configured to have a first diameter 17 and a portion of the diverter manifold 12 located downstream from the inlet portion can be configured to have a second diameter 19 that is greater than the first diameter 17 so as to increase the volume within the diverter manifold 12 providing a greater area or volume in which the gas can move and consequently decrease the velocity of gas. This decrease in velocity aids in the reduction of erosion of the processing equipment of the separator, and also facilitates separation of the sand and particles from the gas.

Figure 6:
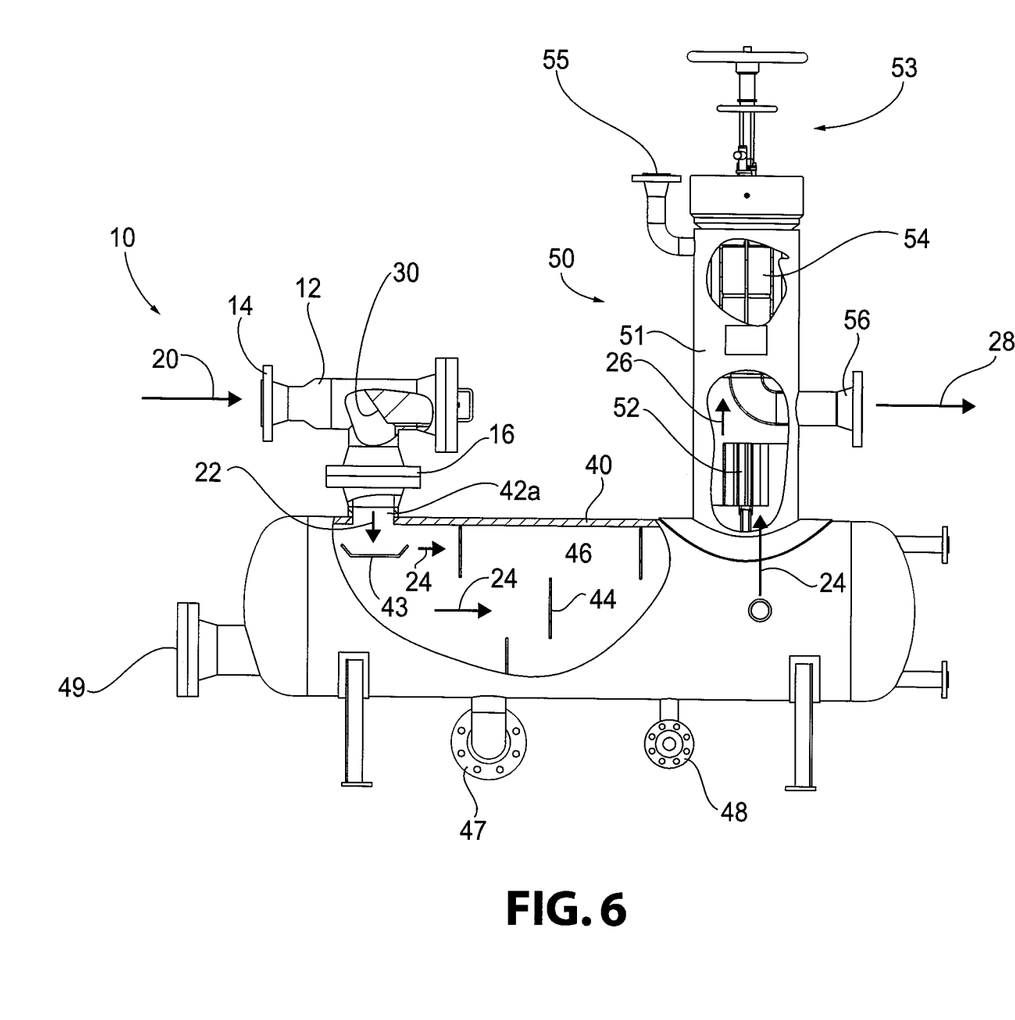
FIG. 6 is a side elevation view including cut-out portions of the bulk deliquidizer/desander coalesce of FIG. 1 in accordance with another embodiment of the invention.

With continuing reference to FIGS. 1-3, and with reference to FIG. 6, a housing 40 is provided in fluid communication with the outlet opening 16 of the diverter manifold 12. The housing can include an inlet 42 and a plurality of baffles 44 located within a horizontal chamber 46 of the housing. The inlet 42 can be curved or elbow-shaped to control the gas flow 22, causing it to flow in a first direction as it enters into the housing 40. Alternatively, as shown in FIG. 6, the inlet can be a straight pipe 42a. A deflector plate 43 can be associated with the straight pipe 42a to redirect the entering gas flow 22 such that the gas flows in a horizontal direction, as shown by 24, through the chamber 46. After entrance into the housing 40, the gas 22 can be directed to flow in a second direction, as shown by 24, through the baffles 44 located throughout the horizontal chamber 46. The larger flow area of horizontal chamber 46 causes the velocity of the gas 24 to further decrease, such that the sand and particles within the gas 24 separate and fall out via gravity. The baffles 44 create an obstructed flow path that can also cause the liquid molecules to contact each other for liquefaction and removal thereof. The sand and other particles, as well as the liquid, settle in a compartment in the bottom of the housing 40 and can eventually exit the housing 40 via one or more drains 47, 48. The housing 40 can also include a clean out port 49.

At least one filter arrangement, generally indicated as 50, is located downstream from the gas inlet 14 and the plurality of baffles 44, for separating liquid from the gas, as shown by arrow 26. The at least one filter arrangement can be a vertical or horizontal 2-phase or 3-phase deliquidizer coalescer separator, such as described in aforementioned U.S. Pat. No. 7,332,010, owned by TM Industrial Supply, Inc. The filter arrangement is described in further detail below.

With particular reference to FIG. 5, the flow diverter 30 includes an impingement plate having a deflector 34. The deflector 34 is angled in a downward direction with respect to the inlet opening 14 of the diverter manifold 12 to cause the gas to divert from the horizontal flow 20 from the inlet opening 14 to the vertically downward flow 22 so that the gas can exit through the outlet opening 16 of the diverter manifold 12 and into the housing 40. According to one embodiment, the deflector is angled at an approximate 45-90° angle with respect to a horizontal centerline "C" extending through the diverter manifold 12. It can be appreciated that this angle can vary depending upon the orientation of the inlet opening 14 with respect to the outlet opening 16 of the diverter manifold 12 and/or to control the reduction in velocity of the flow 20 of the gas entering the inlet opening 14.

The flow diverter 30 can be formed from a solid metal material or any other well-known material capable of withstanding high velocities of the gas/liquid/sand mixture. The diverter manifold 12 can be enlarged, such as by one or even two nominal pipe sizes, as illustrated by 17 and 19 in FIG. 5, to start slowing the gas/liquids/sand/particulate down. According to one example, if the inlet is a 6" pipe, a concentric reducer could be used to make the diverter manifold 12 body from 8" pipe. The flow diverter 30 can include a removable cover 36 connected to the flow diverter 30 to enable removal of the flow diverter 30 from the flow diverter manifold 12 for easy replacement of the diverter 30 due to wear and tear.

With continuing reference to FIG. 3, after moving through the baffles 44, the gas stream 24 can be directed into the at least one filter arrangement 50 contained within housing 51. According to one embodiment, the gas stream 24 can be directed in a vertically upward direction into the filter arrangement 50. The filter arrangement 50 can include at least one vane separator 52 for separating liquid from the gas. The vane separator 52 can remove all liquids down to approximately 10 microns. The almost-dry gas 26 can then move into the gas coalescing chamber where is it supplied through a coalescing filter element 54, such as a pleated filter element, wherein the gas is caused to flow from an exterior of the filter element 54 to a hollow interior of the filter element 54. The coalescing filter element 54 can be a Gas Flow Membrane (GFM), such as described in aforementioned U.S. Pat. No. 7,332,010, and/or can be a system which utilizes GFM Technology® owned by TM Industrial Supply, Inc. The clean, dry gas, as shown by arrow 28, then exits out the bottom portion of the filter element 54 and out of the housing 51 via gas outlet 56. According to one embodiment, the housing 51 can be sealed by a Posi-Sealoc II® closure 53, such as disclosed in U.S. Pat. No. 7,850,751, which is owned by TM Industrial Supply, Inc., the Applicant of the present application, the disclosure of which is hereby incorporated in its entirety. It can be appreciated that other closures, as known in the art, can be used for closing the housing 51 containing the filter arrangement 50. The filter arrangement 50 can also include a vent 55. According to one embodiment, the inlet opening 14 of the diverter manifold 12 and gas outlet 56 of housing 51 can be provided "in line" to fit a standard piping formation.

Referring back to FIGS. 1-3 and 5, a method of removing sand and other particles, as well as liquid from gas 20 under pressure, includes providing a diverter manifold 12 having an inlet opening 14, configured for receiving the gas 20, and an outlet opening 16. The method further includes positioning the diverter manifold 12 on a housing 40 such that the outlet opening 16 of the diverter manifold 12 is in fluid communication with an inlet 42 of the housing 40. The housing 40 includes processing equipment, such as baffles 44 and the like, for separating sand, particles, and/or liquid from the gas. A flow diverter 30 is provided within the diverter manifold 12. The diverter manifold 12 is configured to slow down a velocity of the gas 20 entering into the inlet opening 14 of the diverter manifold 12 by providing a first portion having a first diameter 17 and a second portion, located downstream from the inlet portion, having a second diameter 19 that is larger than the first diameter 17. This increase in diameter provides a larger volume in which the gas can move, thus decreasing the velocity of the gas entering into the inlet opening 14. This decrease in velocity aids in reduction of erosion of the valving, piping, and other process equipment within the separator system, and also aids in the separation of the sand and other particles from the gas stream 20 exiting the wellhead.

According to one embodiment, the inlet opening 14 of the diverter manifold 12 and the gas outlet 56 of the housing 51 containing the gas coalescing filter arrangement 50 can be positioned at least partially in line to fit a standard piping formation. The method further includes providing the flow diverter 30 with an impingement plate having a deflector 34 wherein the deflector 34 has an angle configured to cause a horizontal flow of the gas 20 entering the inlet opening 14 of the diverter manifold 12 to be diverted into a vertical flow of gas 22 prior to exiting the outlet opening 16 of the diverter manifold 12 and entering into the housing 40 for further processing and/or separation. The housing 40 can be associated with either a 2-phase or a 3-phase gas coalescing filter arrangement 50, such as described above, for further separation of the liquid from the gas.

While embodiments of a desander, including a flow diverter that diverts liquid/sand/gas as it enters the coalescer, slowing down the flow and causing the sand to dissipate and drop out of the flow prior to gas/liquid separation are provided in the foregoing description, those skilled in the art may make modifications and alterations to these embodiments without departing from the scope and spirit of the invention. Accordingly, the foregoing description is intended to be illustrative rather than restrictive.

The invention claimed is:

1. A deliquidizer/desander coalescer comprising:
a diverter manifold including an inlet opening and an outlet opening, said inlet opening configured for receiving a gas under pressure;
a flow diverter having an impingement plate positioned within the diverter manifold, said flow diverter positioned with respect to the inlet opening so as to come into contact with the gas, the sand, and the other particles, said flow diverter configured to redirect a flow direction of the gas from a horizontal direction to a vertical direction and to decrease a velocity of the gas entering into the inlet opening of the diverter manifold;
a housing separate from the diverter manifold and having an inlet in fluid communication with the outlet opening of the diverter manifold, said housing including a plurality of baffles located within the housing; and
a filter arrangement located downstream from the inlet opening of the diverter manifold, the inlet of the housing, and said plurality of baffles for separating liquid from the gas, wherein the diverter manifold and the plurality of baffles facilitate separation of the sand and particles from the gas prior to entrance of the gas into the filter arrangement.

2. The coalescer of claim 1, wherein the flow diverter comprises a deflector and wherein the diverter manifold includes a removable cover to enable replacement of the flow diverter.

3. The coalescer of claim 2, wherein the deflector is configured to cause the gas to divert from a horizontal flow from the inlet opening to a vertically downward flow to exit through the outlet opening of the diverter manifold and into the inlet of the housing.

4. The coalescer of claim 1, wherein the inlet opening of the diverter manifold comprises a first portion and a second portion, wherein the second portion is located downstream from the first portion, the first portion having a first diameter and the second portion having a second diameter that is greater than the first diameter wherein the first portion having the first diameter and the second portion having the second diameter are located upstream from the flow diverter so as to increase a volume within the diverter manifold and decrease the velocity of the gas prior to the gas contacting the flow diverter.

5. The coalescer of claim 1, wherein the filter arrangement comprises a vane separator for separating liquid from the gas.

6. The coalescer of claim 1, wherein the filter arrangement comprises a pleated filter element and wherein the coalescer is configured to cause the gas to flow from an exterior of the pleated filter element to a hollow interior of the pleated filter element.

7. The coalescer of claim 1, wherein the filter arrangement is located within a downstream housing having an inlet opening and an outlet opening and wherein the inlet opening of the diverter manifold and the outlet opening of the housing containing the filter arrangement are positioned at least partially in line with each other and on a same elevation.

8. The coalescer of claim 1 including a deflector plate associated with an inlet opening of the housing for contacting the gas flowing from the outlet of the diverter manifold to redirect the gas flow in a horizontal direction.

9. A deliquidizer/desander coalescer comprising:
a diverter manifold including an inlet opening and an outlet opening, said inlet opening configured for receiving a gas under pressure;
a flow diverter having an impingement plate positioned within the diverter manifold, said flow diverter positioned with respect to the inlet opening so as to come into contact with the gas, the sand, and the other particles, said flow diverter configured to redirect a flow direction of the gas from a horizontal direction to a vertical direction and to decrease a velocity of the gas entering into the inlet opening of the diverter manifold;
a housing in fluid communication with the outlet opening of the diverter manifold, said housing including a plurality of baffles located within the housing;
a filter arrangement located downstream from the inlet opening and said plurality of baffles for separating liquid from the gas, wherein the diverter manifold and the plurality of baffles facilitate separation of the sand and particles from the gas prior to entrance of the gas into the filter arrangement,
wherein the flow diverter comprises a deflector configured to cause the gas to divert from a horizontal flow from the inlet opening to a vertically downward flow to exit through the outlet opening of the diverter manifold, wherein the diverter manifold includes a removable cover to enable replacement of the flow diverter; and wherein the deflector is angled at an approximate 45-90° angle with respect to a horizontal centerline extending through the diverter manifold.

10. A method of removing sand, other particles, and liquid from gas under pressure to reduce erosion of downstream processing and gas/liquid separating equipment, said method comprising:

providing a diverter manifold including an inlet opening and an outlet opening, said inlet opening configured for receiving the gas;

positioning a flow diverter having an impingement plate within the diverter manifold, said flow diverter positioned with respect to the inlet opening so as to come into contact with the gas, the sand, and the other particles entering into the diverter manifold, said flow diverter configured to redirect a flow direction of the gas from a horizontal flow direction to a vertical flow direction and to decrease a velocity of the gas entering into the inlet opening of the diverter manifold, and providing a housing separate from the diverter manifold, said housing having an inlet in fluid communication with the outlet opening of the diverter manifold, said housing including at least a plurality of baffles for separating the sand and the other particles from the gas;

wherein the flow diverter and at least the plurality of baffles cooperate together to facilitate separation of the sand and the other particles from the gas.

11. The method of claim 10, wherein said inlet opening of the diverter manifold and an outlet opening in a downstream housing containing the gas/liquid separating equipment are positioned at least partially in line with each other and on a same elevation.

12. The method of claim 10, wherein the impingement plate has an angle configured to cause the horizontal flow direction of the gas entering the inlet opening of the diverter manifold to be diverted into the vertical flow direction prior to exiting the outlet opening of the diverter manifold and entering into the housing and wherein the diverter manifold includes a removable cover to enable replacement of the flow diverter.

13. The method of claim 10 wherein the downstream processing and gas/liquid separating equipment comprises one of a 2-phase and a 3-phase gas coalescing filter and the method includes associating the housing with one of the 2-phase and the 3-phase gas coalescing filter.

14. The method of claim 10, wherein the inlet opening of the diverter manifold comprises a first portion and a second portion, wherein the second portion is located downstream from the first portion, the first portion having a first diameter and the second portion has a second diameter, wherein the second diameter is greater than the first diameter and wherein the first portion having the first diameter and the second portion having the second diameter are located upstream from the flow diverter so as to increase the volume within the diverter manifold to slow down a velocity of the gas entering into the inlet opening of the diverter manifold prior to the gas contacting the flow diverter and entrance of the gas into the housing.

15. The method of claim 10 including a deflector plate associated with an inlet opening of the housing for contacting the gas flowing from the outlet of the diverter manifold to redirect the gas flow in a horizontal direction.

\* \* \* \* \*